(12) United States Patent
Pallemulle et al.

(10) Patent No.: US 10,664,538 B1
(45) Date of Patent: May 26, 2020

(54) DATA SECURITY AND DATA ACCESS AUDITING FOR NETWORK ACCESSIBLE CONTENT

(71) Applicant: Amazon Technologies, Inc., Seattle, WA (US)

(72) Inventors: Sajeeva Lakmal Bandara Pallemulle, Woodinville, WA (US); Camilla De Oliveira Penna Tavares, Seattle, WA (US); Muneer Mirza, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 315 days.

(21) Appl. No.: 15/716,221

(22) Filed: Sep. 26, 2017

(51) Int. Cl.
| | |
|---|---|
| G06F 16/9535 | (2019.01) |
| G06F 21/84 | (2013.01) |
| H04L 29/06 | (2006.01) |
| G06F 21/62 | (2013.01) |
| G06F 16/9038 | (2019.01) |

(52) U.S. Cl.
CPC ...... *G06F 16/9535* (2019.01); *G06F 16/9038* (2019.01); *G06F 21/6218* (2013.01); *G06F 21/84* (2013.01); *H04L 63/101* (2013.01)

(58) Field of Classification Search
CPC ............. G06F 16/9535; G06F 16/9038; G06F 21/6218; G06F 21/84; H04L 63/101
USPC ............. 707/722; 705/14.66, 14.69; 709/226
See application file for complete search history.

(56) References Cited

U.S. PATENT DOCUMENTS

| | | | |
|---|---|---|---|
| 5,634,064 A | 5/1997 | Warnock et al. | |
| 5,872,850 A | 2/1999 | Klein et al. | |
| 5,961,593 A | 10/1999 | Gabber et al. | |
| 6,049,812 A | 4/2000 | Bertram et al. | |
| 6,108,637 A | 8/2000 | Blumenau | |
| 6,138,156 A | 10/2000 | Fletcher et al. | |
| 6,195,679 B1 | 2/2001 | Bauersfeld et al. | |
| 6,430,624 B1 | 8/2002 | Jamtgaard et al. | |

(Continued)

FOREIGN PATENT DOCUMENTS

WO    WO 2013/003631 A2    1/2013

OTHER PUBLICATIONS

Bango, Rey "How JS & Ajax work in Opera Mini 4", Nov. 2, 2007, XP055050107, Retrieved from the Internet.

(Continued)

*Primary Examiner* — Dung K Chau
(74) *Attorney, Agent, or Firm* — Knobbe, Martens, Olson & Bear, LLP (57) ABSTRACT

Systems, methods, and computer-readable media are described for capturing detailed data access audit trails identifying the portions of pages or other files accessed by users from a specific network content source. A graphical representation of a page or file may be rendered by an intermediary system, and an initial portion of the graphical representation may be sent to a user device along with control data. The user device may send interaction data to the intermediary system as the user interacts with the page or file, which may result in additional graphical content being delivered to the user device by the intermediary system. In the event of a corporate data leak or for other data access audit purposes, a system administrator may search stored interaction data to identify which users accessed or viewed specific information within one or more pages or files.

20 Claims, 6 Drawing Sheets

(56) References Cited

U.S. PATENT DOCUMENTS

| | | |
|---|---|---|
| 6,549,941 B1 | 4/2003 | Jaquith et al. |
| 6,560,620 B1 | 5/2003 | Ching |
| 6,625,624 B1 | 9/2003 | Chen et al. |
| 6,704,024 B2 | 3/2004 | Robotham et al. |
| 6,785,864 B1 | 8/2004 | Te et al. |
| 6,871,236 B2 | 3/2005 | Fishman et al. |
| 6,944,665 B2 | 9/2005 | Brown et al. |
| 6,963,850 B1 | 11/2005 | Bezos et al. |
| 7,003,442 B1 | 2/2006 | Tsuda |
| 7,051,084 B1 | 5/2006 | Hayton et al. |
| 7,054,952 B1 | 5/2006 | Schwerdtfeger et al. |
| 7,085,736 B2 | 8/2006 | Keezer et al. |
| 7,159,023 B2 | 1/2007 | Tufts |
| 7,171,478 B2 | 1/2007 | Lueckhoff et al. |
| 7,191,211 B2 | 3/2007 | Tuli |
| 7,353,252 B1 | 4/2008 | Yang et al. |
| 7,373,313 B1 | 5/2008 | Kahle et al. |
| 7,543,059 B2 | 6/2009 | Johnson et al. |
| 7,792,944 B2 | 9/2010 | DeSantis et al. |
| 7,831,582 B1 | 11/2010 | Scofield et al. |
| 7,975,000 B2 | 7/2011 | Dixon et al. |
| 7,996,912 B2 | 8/2011 | Spalink et al. |
| 8,010,545 B2 | 8/2011 | Stefik et al. |
| 8,015,496 B1 | 9/2011 | Rogers |
| 8,060,463 B1 | 11/2011 | Spiegel |
| 8,073,850 B1 | 12/2011 | Hubbard et al. |
| 8,103,742 B1 | 1/2012 | Green |
| 8,185,621 B2 | 5/2012 | Kasha |
| 8,249,904 B1 | 8/2012 | DeSantis et al. |
| 8,271,887 B2 | 9/2012 | Offer et al. |
| 8,316,124 B1 | 11/2012 | Baumback et al. |
| 8,336,049 B2 | 12/2012 | Medovich |
| 8,758,019 B2 * | 6/2014 | Suzansky ............... A61B 5/00 |
| | | 434/247 |
| 8,989,718 B2 | 3/2015 | Ramer |
| 9,037,975 B1 | 5/2015 | Taylor et al. |
| 9,137,210 B1 | 9/2015 | Joglekar et al. |
| 9,183,258 B1 | 11/2015 | Taylor et al. |
| 9,563,928 B1 | 2/2017 | Sokolowski et al. |
| 9,563,929 B1 | 2/2017 | Sokolowski et al. |
| 9,720,888 B1 | 8/2017 | Jain et al. |
| 9,723,053 B1 | 8/2017 | Pallemulle et al. |
| 10,142,272 B2 | 11/2018 | Chakra et al. |
| 2001/0039490 A1 | 11/2001 | Verbitsky et al. |
| 2002/0030703 A1 | 3/2002 | Robertson et al. |
| 2002/0040395 A1 | 4/2002 | Davis et al. |
| 2002/0059425 A1 * | 5/2002 | Belfiore .................. G06F 9/54 |
| | | 709/226 |
| 2002/0099829 A1 | 7/2002 | Richards et al. |
| 2002/0194302 A1 | 12/2002 | Blumberg |
| 2003/0023712 A1 | 1/2003 | Zhao et al. |
| 2003/0041106 A1 | 2/2003 | Tuli |
| 2004/0083294 A1 | 4/2004 | Lewis |
| 2004/0139208 A1 | 7/2004 | Tuli |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0243622 A1 | 12/2004 | Morisawa |
| 2004/0267723 A1 | 12/2004 | Bharat |
| 2005/0010863 A1 | 1/2005 | Zernik |
| 2005/0060643 A1 | 3/2005 | Glass et al. |
| 2005/0138382 A1 | 6/2005 | Hougaard et al. |
| 2005/0183039 A1 | 8/2005 | Revis |
| 2005/0246193 A1 | 11/2005 | Roever et al. |
| 2006/0085766 A1 | 4/2006 | Dominowska et al. |
| 2006/0095336 A1 | 5/2006 | Heckerman et al. |
| 2006/0122889 A1 | 6/2006 | Burdick et al. |
| 2006/0168510 A1 | 7/2006 | Bryar et al. |
| 2006/0184421 A1 | 8/2006 | Lipsky et al. |
| 2006/0248442 A1 | 11/2006 | Rosenstein et al. |
| 2006/0277167 A1 | 12/2006 | Gross et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | M. Blackwell et al. |
| 2007/0124693 A1 | 5/2007 | Dominowska et al. |
| 2007/0139430 A1 | 6/2007 | Korn et al. |
| 2007/0226044 A1 | 9/2007 | Hanson |
| 2007/0240160 A1 | 10/2007 | Paterson-Jones et al. |
| 2007/0288589 A1 | 12/2007 | Chen et al. |
| 2007/0288855 A1 | 12/2007 | Rohrabaugh et al. |
| 2008/0028334 A1 | 1/2008 | De Mes |
| 2008/0086264 A1 | 4/2008 | Fisher |
| 2008/0104502 A1 | 5/2008 | Olston |
| 2008/0183672 A1 | 7/2008 | Canon et al. |
| 2008/0184128 A1 | 7/2008 | Swenson et al. |
| 2008/0222273 A1 | 9/2008 | Lakshmanan et al. |
| 2008/0320225 A1 | 12/2008 | Panzer et al. |
| 2009/0012969 A1 | 1/2009 | Rail et al. |
| 2009/0164924 A1 | 6/2009 | Flake et al. |
| 2009/0177538 A1 | 7/2009 | Brewer et al. |
| 2009/0204478 A1 | 8/2009 | Kaib et al. |
| 2009/0217199 A1 | 8/2009 | Hara et al. |
| 2009/0248680 A1 | 10/2009 | Kalavade |
| 2009/0254867 A1 | 10/2009 | Farouki et al. |
| 2009/0282021 A1 | 11/2009 | Bennett |
| 2009/0287698 A1 | 11/2009 | Marmaros et al. |
| 2009/0327914 A1 | 12/2009 | Adar et al. |
| 2010/0036740 A1 | 2/2010 | Barashi |
| 2010/0057639 A1 | 3/2010 | Schwarz et al. |
| 2010/0094878 A1 | 4/2010 | Soroca et al. |
| 2010/0125507 A1 | 5/2010 | Tarantino, III et al. |
| 2010/0131594 A1 | 5/2010 | Kashimoto |
| 2010/0138293 A1 | 6/2010 | Ramer et al. |
| 2010/0218106 A1 | 8/2010 | Chen et al. |
| 2010/0293190 A1 | 11/2010 | Kaiser et al. |
| 2010/0306335 A1 | 12/2010 | Rios et al. |
| 2010/0312788 A1 | 12/2010 | Bailey |
| 2010/0318892 A1 | 12/2010 | Teevan et al. |
| 2010/0332513 A1 | 12/2010 | Azar et al. |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0078140 A1 | 3/2011 | Dube et al. |
| 2011/0078705 A1 | 3/2011 | Maclinovsky et al. |
| 2011/0119661 A1 | 5/2011 | Agrawal et al. |
| 2011/0161849 A1 | 6/2011 | Stallings et al. |
| 2011/0173177 A1 | 7/2011 | Junqueira et al. |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0212717 A1 | 9/2011 | Rhoads et al. |
| 2011/0214082 A1 | 9/2011 | Osterhout et al. |
| 2011/0246873 A1 | 10/2011 | Tolle et al. |
| 2011/0258049 A1 * | 10/2011 | Ramer .................. G06Q 30/02 |
| | | 705/14.66 |
| 2011/0289074 A1 | 11/2011 | Leban |
| 2011/0296341 A1 | 12/2011 | Koppert |
| 2011/0302510 A1 | 12/2011 | Harrison et al. |
| 2012/0072821 A1 | 3/2012 | Bowling |
| 2012/0084644 A1 | 4/2012 | Robert et al. |
| 2012/0096365 A1 | 4/2012 | Wilkinson et al. |
| 2012/0110017 A1 | 5/2012 | Gu et al. |
| 2012/0137201 A1 | 5/2012 | White et al. |
| 2012/0143944 A1 | 6/2012 | Reeves et al. |
| 2012/0150844 A1 | 6/2012 | Lindahl et al. |
| 2012/0166922 A1 | 6/2012 | Rolles |
| 2012/0198516 A1 | 8/2012 | Lim |
| 2012/0210233 A1 | 8/2012 | Davis et al. |
| 2012/0215834 A1 | 8/2012 | Chen et al. |
| 2012/0215919 A1 | 8/2012 | Labat et al. |
| 2012/0284629 A1 | 11/2012 | Peters et al. |
| 2012/0290950 A1 | 11/2012 | Rapaport et al. |
| 2012/0317295 A1 | 12/2012 | Baird et al. |
| 2012/0331406 A1 | 12/2012 | Baird et al. |
| 2013/0007101 A1 | 1/2013 | Trahan et al. |
| 2013/0031459 A1 | 1/2013 | Khorashadi |
| 2013/0031461 A1 | 1/2013 | Hou et al. |
| 2013/0066673 A1 | 3/2013 | Rose |
| 2013/0080611 A1 | 3/2013 | Li et al. |
| 2013/0103764 A1 | 4/2013 | Verkasalo |
| 2013/0198641 A1 | 8/2013 | Brownlow et al. |

(56) References Cited

U.S. PATENT DOCUMENTS

| | | | |
|---|---|---|---|
| 2013/0275889 A1 | 10/2013 | O'Brien-Strain | |
| 2014/0068459 A1* | 3/2014 | Graham | G06Q 50/01 715/753 |
| 2014/0136942 A1 | 5/2014 | Kumar et al. | |
| 2014/0136951 A1 | 5/2014 | Kumar et al. | |
| 2014/0136971 A1 | 5/2014 | Kumar et al. | |
| 2014/0136973 A1 | 5/2014 | Kumar et al. | |
| 2014/0195513 A1* | 7/2014 | Raichelgauz | H04H 20/38 707/713 |
| 2014/0280251 A1* | 9/2014 | Somekh | G06F 16/9535 707/754 |
| 2015/0178282 A1* | 6/2015 | Gorur | G06F 16/9535 707/748 |
| 2015/0379132 A1* | 12/2015 | Cho | G06F 16/9535 707/722 |
| 2017/0221052 A1* | 8/2017 | Sheng | G06Q 20/3678 |
| 2017/0235768 A1* | 8/2017 | Amrutkar | G06F 16/5866 707/722 |

OTHER PUBLICATIONS

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

Brinkmann, M, "Record and Share your browser history with Hooeey," ghacks.net, Feb. 26, 2008, 6 pages, printed on Jan. 25, 2013.

Chen, H., et al., "Bringing Order to the Web: Automatically Categorizing Search Results," Proceedings of the SIGCHI Conference on Human Factors in Computing Systems, Apr. 1-6, 2000, pp. 145-152.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Considine, A, "The Footprints of Web Feet," The New York Times, Mar. 4, 2011, 3 pages, printed on Jan. 25, 2013.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/TECH/computing/9910/18/r.u.sure/index.html, 3 pages.

Rao, H.C.-H.,et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

Van Kleek, M, Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

U.S. Appl. No. 14/285,317, filed May 22, 2014.
U.S. Appl. No. 14/285,492, filed May 22, 2014.
U.S. Appl. No. 14/285,200, filed May 22, 2014.
U.S. Appl. No. 14/285,060, filed May 22, 2014.
U.S. Appl. No. 14/285,275, filed May 22, 2014.
U.S. Appl. No. 14/285,300, filed May 22, 2014.
U.S. Appl. No. 14/285,477, filed May 22, 2014.
U.S. Appl. No. 14/285,442, filed May 22, 2014.
U.S. Appl. No. 14/302,261, filed Jun. 11, 2014.
U.S. Appl. No. 14/285,334, filed May 22, 2014.
U.S. Appl. No. 13/371,314, filed Feb. 10, 2012.
U.S. Appl. No. 15/281,926, filed Sep. 30, 2016.
U.S. Appl. No. 15/276,663, filed Sep. 26, 2016.

* cited by examiner

| Session # | User ID | Activity stream | Security Levels of File Portions Accessed |
|---|---|---|---|
| 1001 | 8192 | Page1: Select_Widget2, Scroll_Section2, Highlight_Text7, SelectLink_File23.pdf. File23.pdf: View_File23_page1, View_File23_page2, View_File23_page3. Page2: Scroll_Section2, Scroll_Section3, Expand_Widget9, SelectLink_Page3. | Standard, Confidential |
| 1002 | 8192 | Page1: Scroll_Section2, ScreenshotTaken_Section2, SelectLink_Page9. Page9: EnterText_Field3, Select_button3. | Standard, Confidential |
| 1003 | 523 | Page9: EnterText_Field3, Select_button3. Page2: Scroll_Section2, Scroll_Section3, Expand_Widget9, SelectLink_Page3. | Confidential, Top Secret |
| 1004 | 88 | Page2: Scroll_Section3, Expand_Widget9, SelectLink_Page3. Page5: Scroll_Section2, SelectLink_Page6. | Standard |
| 1005 | 971 | Page9: EnterText_Field2, EnterText_Field3, Select_button3. ...... | Standard |

User Activity Audit Administration http://www.example.com/audit_access.html

User Activity Search Results

Users who accessed Confidential information in the past 30 days:

1) <u>Walter Randolph</u> -- Employee ID #41938
   Confidential information accessed:
   - "Employee SSN" section of <u>CompanyWebPage6</u>
     Time spent on section: 2 minutes, 18 seconds
     606  Screenshot taken? No;   Highlighted/copied content? Yes
     <u>Replay</u> interactions during this browsing session

- "Product RoadMap" object on page 31 of <u>TechPlans.pdf</u>
     Time spent on page: 8 minutes, 15 seconds (approximate)
     Screenshot taken? Yes;   Highlighted/copied content? Yes
     <u>Replay</u> interactions during this browsing session 2) <u>Amy Roberts</u> -- Employee ID #32901
   Confidential information accessed:
   - "Health Insurance Claims" section of <u>BenefitsAnnualReport.pdf</u>
     Time spent on section: 1 minute, 45 seconds

DATA SECURITY AND DATA ACCESS AUDITING FOR NETWORK ACCESSIBLE CONTENT

BACKGROUND

Generally described, computing devices and communication networks can be utilized to exchange information. In a common application, a computing device can request content from another computing device via the communication network. For example, a user at a personal computing device can utilize a browser application to request a page from a server computing device via the Internet. In such embodiments, the user computing device can be referred to as a client computing device and the server computing device can be referred to as a content provider.

Often a company or other organization will provide pages and files to its employees or other members via a server computing device that the employee users can access from their personal computing devices. Such pages may be considered part of a corporate intranet, in some instances. The company or other organization may maintain user accounts for its employees that may be assigned different levels of access privileges to pages and files accessible from the server depending on factors such as the given user's role or job function. Some users may be granted access to confidential, sensitive or otherwise restricted documents or data via the company's server. In the event of an unauthorized "leak" of restricted data (such as restricted data becoming known to a party outside of the organization either through a compromised user account or an employee improperly sharing information outside of the organization), it is often difficult for an administrative user at the company to identify potential sources of the data leak.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Generally described, aspects of the present disclosure relate to capturing detailed audit trails identifying the portions of pages or other files accessed by a user from a certain network content source, such as a company's server(s) or other organization's server(s). A graphical representation of a page or file may be rendered by an intermediary system that is in communication with the organization's server, and an initial portion of the graphical representation may be sent to a user device along with control data. The user device may send interaction data to the intermediary system as the user interacts with the page or file, which may result in additional graphical content being delivered to the user device by the intermediary system. In the event of a corporate data leak or for other data audit purposes, a system administrator associated with the organization may search interaction data stored by the intermediary system to identify which users accessed or viewed specific information within one or more pages or files. Aspects of the present disclosure enable administrators to configure a variety of data access auditing levels and provide significantly more detailed audit trails than in traditional systems that may only store a list of each file or webpage accessed by a user, such as a list of each page's uniform resource identifier ("URI").

Aspects of the present disclosure provide benefits, for example, in the event of a data leak where certain sensitive or restricted information has been leaked to an unauthorized individual or entity, or for complying with various data handling requirements. Such data handling requirements or restrictions may include industry and/or government regulations, such as the Payment Card Industry Data Security Standard ("PCI DSS"), the Health Insurance Portability and Accountability Act ("HIPPA"), Financial Intermediary Controls and Compliance Assessment ("FICCA"), Sarbanes-Oxley ("SOX") Act compliance requirements, or corporate or government classification (e.g., U.S. government classification levels such as secret, top secret, etc.). Aspects of the present disclosure also provide security features that limit the portions of a webpage or file that are sent to a client system for display by first sending a user-requested file from a originating content server to an intermediary server that then sends portions or individual pages of the file to a user's device as the user scrolls or otherwise requests access to subsequent portions of the file. In this manner, an administrator not only can know whether a specific portion of information deep within a multi-page document was actually presented on screen to a particular user, but can ensure that the specific portion of information is not sent to a user's device if the user does not read that far into the document during the relevant browsing session. As used herein, the meaning of the term "page" may vary depending on the context. For example, as the term is commonly used in the art, a webpage may be considered to be a "page," even if its length is much greater than what would fit on a single printed piece of paper and requires significant scrolling by a user to view in its entirety. However, a single electronic file may also be a multi-page document, such as a document saved by a word processing program or a Portable Document Format ("PDF") file, each of which may include clearly defined pagination and include a number of individual pages within a single document. As used herein, the term "file" may refer to a webpage (or similar file in which the entire file may be considered to be a page), as well as to a multi-page document such as a PDF file, a document created by a word processing program, etc.

In one embodiment, an intermediary system is positioned in a network between client computing devices and an organization's content sever. In one example, the organization may be a company, the page content available via the organization's content server may be corporate intranet pages available only to employees or other members of the organization, and the client computing devices may be used by the organization's employees or other members to view the pages. The intermediary system may receive a variety of user interaction data (including, for example, scroll requests, zoom requests, text highlighting, and others) beyond what would typically be captured and returned to a server in a traditional browsing environment that does not utilize an intermediary system as described herein.

In one embodiment, when a client computing device requests a page associated with the organization's content server, the page may first be generated in a graphical representation form with associated control information (discussed further below) by the intermediary system, then delivered from the intermediary system for display in the graphical form to the client computing device. In some embodiments, the graphical representation of the page or other file may be sent to the client computing device gradually in response to scroll requests rather than as a single file transmission, as will be further discussed below. The graphical representation of the page or portions of the graphical representation may be sent to the client computing device along with code that enables the user's browsing experience to mimic a traditional browsing experience (for example, interactions with the page may not seem different from the user's perspective than if the original page had been sent to the client computing device from the organization's content server rather than a graphical representation of the page having been sent from the intermediary system). In order for the client computing device to respond properly to user interactions with the graphical page representation, code and control information associated with the graphical page representation may instruct the client computing device to send various interaction data identifying user actions taken with respect to the page (such as scroll requests, zoom requests, text highlighting, and others) in order for the intermediary system to determine whether additional content should be sent to the client computing device in response to each interaction.

For content pages that include interactive elements (e.g., search fields, drop-down boxes, hyperlinks, etc.), presenting a graphical representation of the page without more may be unacceptable for some use-cases. One solution to this problem involves emulating one or more interactive elements, or controls, of a content page on a user device. The emulated interactive elements or emulated controls may be included as part of an overlay layer positioned above a graphical representation of the content page. Information or control metadata for each control included in the content page may be provided to a user device along with the graphical representation of the content page. The user device, or systems therein, may use the control metadata to identify types of controls to emulate. Further, the user device may identify where to position the emulated control with respect to the graphical representation of the content page based at least partially on the received control metadata. Systems and methods for providing such emulated controls are discussed in more detail in co-owned U.S. Pat. No. 9,037,975, titled "Zooming Interaction Tracking and Popularity Determination," filed Feb. 10, 2012 and issued May 19, 2015.

Interactions with the emulated controls may be provided to the intermediary system for processing. Further, an identifier of the control being simulated by the emulated control that received the user input may be provided to the intermediary system. Using the identifier of the control to identify the control, the intermediary system may interact with the control of the content page at a host system based on the user input received by the emulated controls. In some cases, interactions with the content page may result in the content page being modified and/or a new content page being retrieved. In some such cases, the intermediary system may generate a new graphical representation associated with the updated content page and/or the new content page. This new graphical representation may be provided to the user device for display to the user. Thus, in certain embodiments, the processing of interactions with a content page may be offloaded from a user device to an intermediary system. Further, in some embodiments, by offloading the processing to the intermediary system, page load times perceived by end users are reduced without loss of interactivity with the page. Aspects of the present disclosure include storing, processing and searching the rich interaction data that may be received by the intermediary system in order to provide data access audit services and better comply with various data access restrictions.

Figure 1:
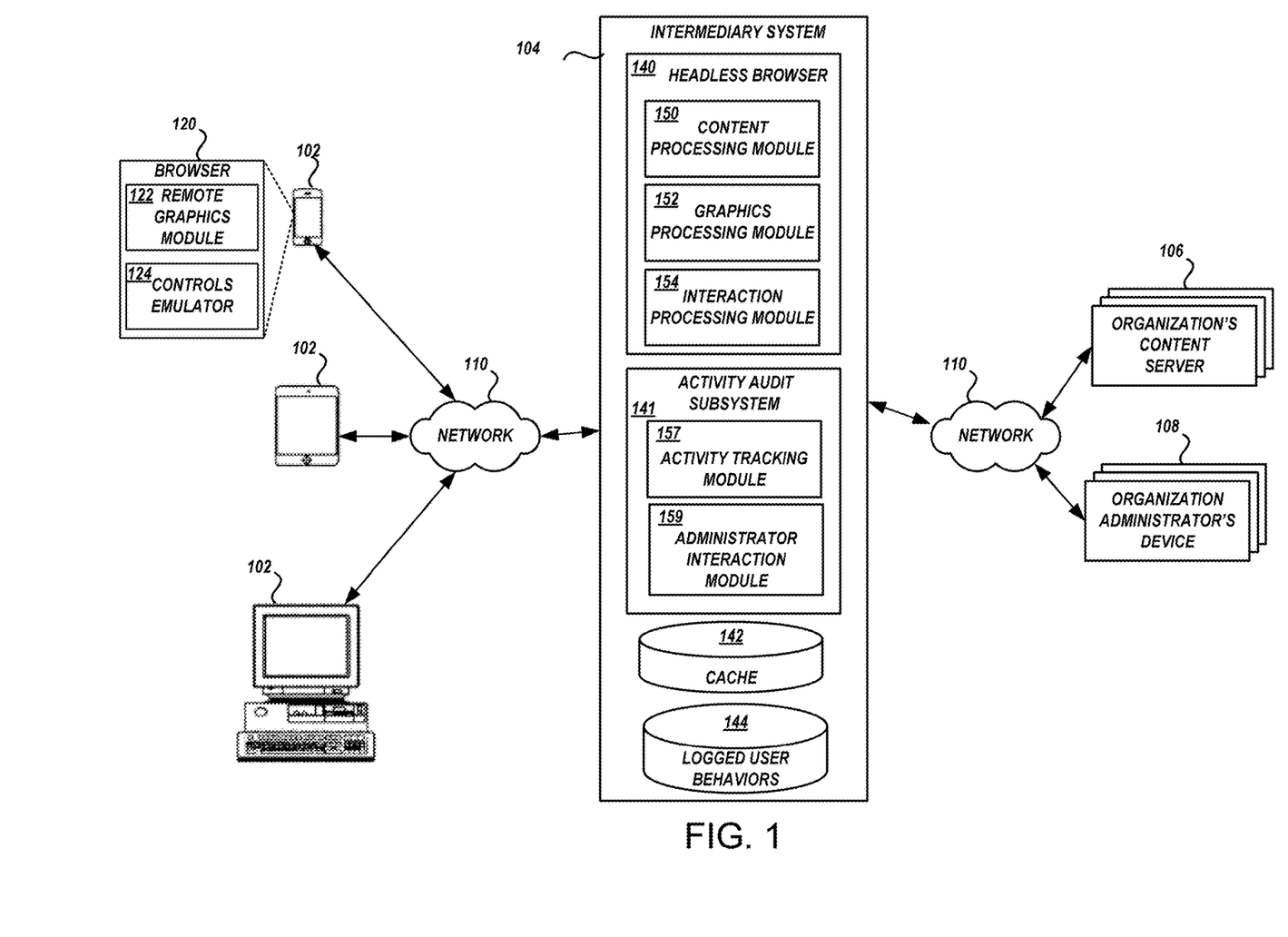
FIG. 1 illustrates an example network environment in which features can be implemented for generating graphical page representations at an intermediary system, tracking user interactions with the graphical page representations, and searching prior interaction information.

FIG. 1 illustrates an example network environment in which features can be implemented for generating graphical page representations at an intermediary system, tracking user interactions with the graphical page representations, and searching prior interaction information. The network environment shown in FIG. 1 includes various user devices 102, an intermediary system 104, one or more content servers 106 of an organization, and one or more computing devices 108 used by one or more administrators of the organization. The organization that operates the content server 106 (or that has its page content accessible via the content servers 106) may be, for example, a company, a government entity, a nonprofit organization, or other organization that makes one or more pages available for access by its employees, members, or other affiliated individuals. The system components may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc., or combination thereof, each with access to and/or from an external network, such as the Internet.

As will be appreciated by those of skill in the relevant art, a network environment may include any number of distinct user devices 102 and/or content sources 106. In addition, multiple (e.g., two or more) intermediary systems 104 may be used. For example, separate intermediary systems 104 may be located so that they are close (in either a geographical or networking sense) to groups of current or potential user devices 102 or content sources 106. In such a configuration, a user device 102 may request content via the intermediary system 104 to which it is closest, rather than all user devices 102 requesting content via a single intermediary system 104. In some embodiments, the intermediary system 104 may operate in association with only a single organization's content server(s) 106, while in other embodiments the intermediary system 104 may provide page rendering and optimization services to a number of different organizations that each operate different content servers.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), kiosks, and various other electronic devices and appliances. Individual user devices 102 may execute a browser application 120 to communicate via the network 110 with other computing systems, such as the intermediary system 104 or content sources 106, in order to request and display content.

Illustratively, a user may use a browser application 120, or other application capable of accessing a network site, to request network-accessible content (e.g., content pages, images, video, etc.) hosted or provided by a content source, such as an organization's content server 106. The user device 102 or browser application 120 may be associated with the intermediary system 104 or otherwise configured to request the content through, and receive content display commands from, the intermediary system 104 rather than communicating directly with the content source. The browser application 120 may include a remote graphics module 122 that receives remotely-generated display commands, such as those generated by the intermediary system 104. The remote graphics module 122 (or some other module of the browser application 120 or user device 102) can execute the remote-generated display commands to display a representation of the requested content on the user device 102. Advantageously, the remote graphics module 122 may facilitate the display of graphical representations of requested content on the user device 102 without requiring the user device 102 to receive content files (e.g., HTML files, JPEG images, etc.) from content sources such as the organization's content server 106.

In some embodiments, the browser 120 may be a conventional web browser or network-site browser that is not specifically designed or configured to execute remotely-generated graphics commands and other display commands. For example, the browser 120 may use or otherwise be associated with a remote graphics module 122 that may or may not be integrated with the browser 120, such as a browser add-in or extension. In some embodiments, applications other than a browser 120 may include or use a remote graphics module 122 (or some similar module) to execute graphics commands generated by an intermediary system 104. For example, content aggregators or other specialized content display applications for mobile devices may utilize a remote graphics module 122.

The browser 120 may include a controls emulator 124, which may be configured to emulate, or generate representations of, one or more controls of a content page. The controls emulator 124 may use control metadata received from the intermediary system 104 to determine the number of controls to emulate, the type of controls to emulate, and the location of the controls with respect to a content page. Using the control metadata, the controls emulator 124 can emulate one or more controls and position the emulated controls over a graphical representation of the content page on the user device. Advantageously, in certain embodiments, by positioning emulated controls over the graphical representation of the content page a user can interact with the content page despite being presented with the graphical representation of the content page in place of the content page. In other words, in some cases, although a user may be presented with an image or snapshot of the content page, the user may interact with the content page using the emulated controls that are positioned or layered over the image of the content page.

In certain embodiments, the emulated controls include the same or similar functionality as the controls they mimic. When a user interacts with the emulated controls, the interaction and/or input to the emulated controls may be provided to the intermediary system 104. Intermediary system 104 may replicate the interaction on a system that hosts the content page (e.g., the organization's content server 106) and/or may provide the input to the host system of the content page. In certain embodiments, intermediary system 104 may access and/or retrieve a modified version of the content page that is responsive to the interaction with and/or input provided to the host system of the content page. The intermediary system 104 may generate a graphical representation of the modified version of the content page and provide the graphical representation to the user device 102. Thus, in certain embodiments, the user may interact with a content page via emulated controls and through the intermediary system 104 despite being presented with an image or graphical representation of the content page at the user device 102 in place of the content page itself. In some embodiments, the functionality of the remote graphics module 122 and/or controls emulator 124 may be implemented by a typical browser application operating on the user device 102 as a result of the browser executing code received from the intermediary system 104 when receiving the graphical representation of a page, without necessarily requiring any specialized browser, software installation, or a browser plug-in on the user device.

The intermediary system 104 can be a computing system configured to retrieve content on behalf of user devices 102 and generate display commands for execution by the user devices 102. For example, the intermediary system 104 can be a physical server or group of physical servers that may be accessed via the network 110. In some embodiments, the intermediary system 104 may be a proxy server, a system operated by an internet service provider (ISP), and/or some other device or group of devices that retrieves content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as a "headless browser" 140. Generally described, a headless browser 140 does not (or is not required to) cause display of content by a graphical display device of the server on which the headless browser 140 is executing. Instead, the headless browser 140 provides display commands, graphical representations, images, or other data or commands to separate user devices 102 that can cause the presentation of content accessed by the headless browser 140 on one or more of the separate user devices 102. Illustratively, the headless browser 140 may obtain requested content from an organization's content server 106 and/or another server, obtain additional items (e.g., images and executable code files) referenced by the requested content, execute code (e.g., JavaScript) that may be included in or referenced by the content, generate graphics commands to display a graphical representation of the content, and transmit the graphics commands to the user device 102. Further, in some cases, the headless browser 140 may create graphical representations of a content page or some other file type, or one or more content resources of a content page, and provide the graphical representations to the user device 102. By performing some or all of these operations at the intermediary system 104, the substantial computing resources and high-speed network connections typically available to network-based server systems may be leveraged to perform the operations much more quickly than would be possible on a user device 102 with comparatively limited processing capability.

The headless browser 140 may include various modules to provide the functionality described above and in greater detail below. For example, the headless browser 140 may include a content processing module 150, a graphics processing module 152, and an interaction processing module 154. The content processing module 150 may include any system that can parse content files and generate a document object model ("DOM") or similar representation of the content. Further, in some cases, the content processing module 150 may include logic for determining how to divide a content page into a set of tiles to be provided to the browser 120 and/or the remote graphics module 122.

The graphics processing module 152 may include any system that can receive the DOM representation and generate display commands (e.g., SKIA commands) to render a graphical representation of the content on a user device 102. In some cases, the graphics processing module 152 may further receive definitions or metadata for each tile from the set of tiles determined by the content processing module 150. The graphics processing module 152 may use the tile definitions to generate the display commands to render the graphical representation of the content at the user device 102. For instance, each tile may be associated with its own display command or set of commands for displaying the tile on the user device 102. In some embodiments, the graphics processing module 152 instead of, or in addition to, the content processing module 150 may determine how to divide the content page into the set of tiles. The interaction processing module 154 may include any system that communicates with the browser 120 to receive information regarding interactions with the content on the user device 102 and to update the graphical representation of the content, if necessary. Further, the interaction processing module 154 may provide the tiles and/or display commands to the user device 102. In some embodiments, a headless browser 140 may include additional or fewer modules than those shown in FIG. 1. The use of tiles and associated display commands, including generating responsive content based on interaction with an emulated control, is discuss in more detail in co-owned U.S. patent application Ser. No. 14/285,317, titled "Emulation of Control Resources for Use with Converted Content Pages," filed May 22, 2014, the disclosure of which is hereby incorporated by reference in its entirety herein.

The intermediary system 104 may include additional modules, components, data stores, and the like to provide the features described above and in greater detail below. For example, the intermediary system 104 may include a cache 142 that stores content items retrieved from content sources 106, graphics commands generated by the headless browser 140, graphical representations of content resources or portions of the content page (such as graphical representations previously sent to one or more client computing devices), and the like. The intermediary system 104 may also include a logged user behaviors data store 144 that stores information about user requests and interactions with content.

In some embodiments, the cache 142 may store graphical representations of content pages generated by the headless browser 140, together with any controls metadata for emulating one or more controls included in the content pages, for a predetermined period of time after the content page request or after connection between the user device and the intermediary system has terminated. In some embodiments, interactions stored in the logged user behaviors data store 144 can be used to deliver a graphical representation of the content page and controls metadata reflecting previous user interactions with the page. The logged user behaviors data store 144 may, in some embodiments, store an activity stream or set of actions performed by each user, including data associating the activity with a particular user and optionally with a particular browsing session, as will be described further below.

As further illustrated in FIG. 1, the intermediary system additionally includes a mobile optimization subsystem 141, which includes an activity tracking module 157 and audit administrator module 159. In other embodiments than that illustrated in FIG. 1, the activity audit subsystem 141 (including the modules 157 and 159) may be a separate system from the intermediary system 104, and may be in communication with the intermediary system 104 and/or the logged user behaviors data store 144. As will be described further below, the activity tracking module 157 may organize and supplement user activity data stored in the logged user behaviors data store 144 (in cooperation with the interaction processing module 154, in some embodiments) to identify the specific file portions and objects actually viewed or accessed by users during specific browsing sessions and to maintain sufficient information in the logged user behaviors data store 144 to enable the audit administrator module 159 to respond to future audit requests or generate related data access audit reports for a user of an organization administrator's device 108.

Although in the examples described herein the intermediary system 104 is configured to communicate between the organization's content servers 106 and user devices 102 to execute the processes described herein, in some embodiments the organization's content servers 106 can be configured to generate graphical representations of content pages and to provide controls metadata to enable the user devices 102 to emulate controls in the content pages and to send the graphical representation of the content pages and the controls metadata directly to a user device. For example, the capability to perform the graphical representation generation processes and the controls metadata determination processes can be provided to organization's content servers 106 in the form of an add-in, plug-in, or extension. Accordingly, any of the graphical representation generation and controls metadata determination processes described herein as being performed by the intermediary system 104 can, in some embodiments, be performed additionally or exclusively by the organization's content servers 106, in which case the intermediary system may be omitted. In such cases, the organization's content server 106 may include an activity audit subsystem 141 that enables the various activity audit and tracking features described herein without the use of an intermediary system.

Figure 2:
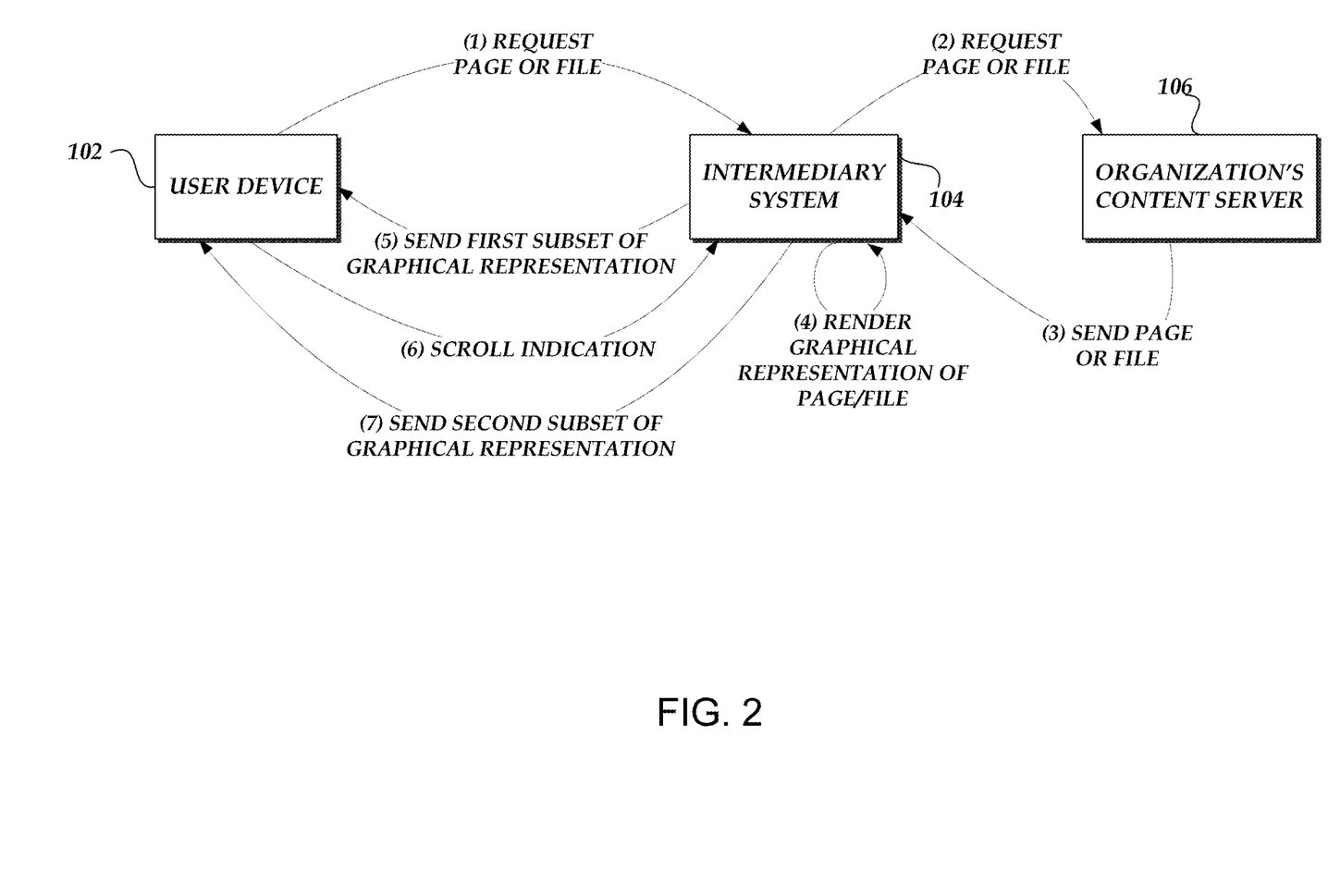
FIG. 2 is an illustrative data flow diagram in which an intermediary system provides different subsets of a graphical representation of a page or file to a user device in response to scroll indications received from the user device.

FIG. 2 is an illustrative data flow diagram in which an intermediary system 104 provides different subsets of a graphical representation of a page or file to a user device in response to scroll indications received from the user device. The various communications between systems or devices illustrated in FIG. 2 may be, in one embodiment, network communications via the Internet. The user device 102 may initially request a page or file associated with the organization's content server 106, but the organization may direct that such page or file requests go to the intermediary system 104, as opposed to the user device 102 communicating directly with the organization's content server 106, as discussed above. The page or file may be, for example, a webpage, page for display within a particular application operating on the user device 102, a text file (such as a plain text file or a document stored in a file format associated with a word processing program), a PDF, or one of many other file formats that can be rendered for display by an appropriate program operating on a computing device. The page or file request may indicate a URI or other network location identifier for the page or file, and may be sent to the intermediary system 104 by a browser or other application operating on the user device 102 in response to a user selection (such as a user selecting a link or other selectable option identifying the page or file within a previously displayed page or user interface).

When the intermediary system 104 receives the file request from the user device 102, the intermediary system requests the page or file from the content server 106 (or otherwise retrieves the page or file from the content server or a local cached copy at the intermediary system). As discussed above, the intermediary system 104 may then render a graphical representation of the page or file. For example, the headless browser 140 of the intermediary system 104 may obtain additional items (e.g., images and executable code files) referenced within the received page or file, execute code that may be included in or referenced in the page or file, and generate graphics commands to display a graphical representation of the content. For other types of files, such as a file that is already in a graphical representation form (such as a file in a vector image format), the intermediary system 104 may temporarily store the received file for subsequent delivery in portions or sections to the user device 102 without first rendering or otherwise creating a new graphical version of the file content.

As illustrated in FIG. 2, the intermediary system 104 may then send a first subset of the graphical representation of the file to the user device 102 for display via the browser 120 or other application operating on the user device 102. The first subset may be the start of the graphical representation, but less than the full graphical representation. Depending on the embodiment, the first subset may be one or more of the initial screens worth of content (e.g., the amount of graphical content initially sent to the user device 102 may be the amount of graphical content that can fit on the display screen of the user's device, or some multiple of that amount), one or more initial pages of a multi-page document (e.g., if the requested file is a document in the PDF format that includes multiple clearly delineated pages within the document, the first subset of content sent to the user device 102 may be the first page of the PDF file), the graphical representation of one or more of the first sections or objects of the file (which may be determined, in one embodiment, based on a DOM associated with the file), or based on some other logical breakdown of the graphical representation into ordered subsets.

As the user views and interacts with the first subset of the graphical representation of the page or file using the user device 102, user input received via emulated controls that were provided by the intermediary system in association with the graphical representation may be reported back to the intermediary system 104 from the user device 102, as previously discussed. As illustrated in FIG. 2, one such interaction may be a scroll indication, which may be received as a result of the user selecting a displayed scroll arrow (e.g., a graphical element that the user selects to request to scroll down and view a next portion of the page or file), pressing a "page down" or similar key or button, manipulating a scroll wheel on a mouse or other input device, making a swipe gesture or similar touch-based gesture on a touchscreen device, or other input mechanism. In response, the intermediary system 104 may then send a subsequent portion of the graphical representation to the client device for display. As an example, the intermediary system may then send a second page of a PDF file if the first page of the PDF file was previously sent.

In this manner, network bandwidth and storage requirements on the user device 102 may be minimized relative to alternatives of sending graphical representations of an entire file at once. Furthermore, this approach enhances security and lowers the risk of sensitive information being sent to a user device if the user never actually requests to view the specific portion of the document in which the given information appears. For example, if certain sensitive or restricted medical, financial or proprietary information is included on page 10 of a document, but a given user only scrolls through the first 5 pages of the document, the intermediary system 104 in some embodiments would not send any representation of the given sensitive information to the user device 102. Because the scroll requests and other user interaction data is stored by the intermediary system 104, the user interaction data could later be analyzed to determine that although the user accessed the file that included the sensitive information, the user did not view or receive the sensitive information. In some embodiments, the subsets of the graphical representation sent to the user device may include a computer-interpretable instruction or tag indicating to a browser or other application that the user device 102 should not store a cached copy of the graphical representation, which may further increase security.

While FIG. 2 has been described with respect to scroll requests, it will be appreciated that additional subsets of the graphical representation of the page or file may alternatively be sent in response to other types of user interactions, such as a zoom request, or a request to expand a section or portion of a page (e.g., selecting an expand icon or interface element indicating that a user wishes to view additional content associated with an initially minimized or partially hidden section of a page).

Figure 3:
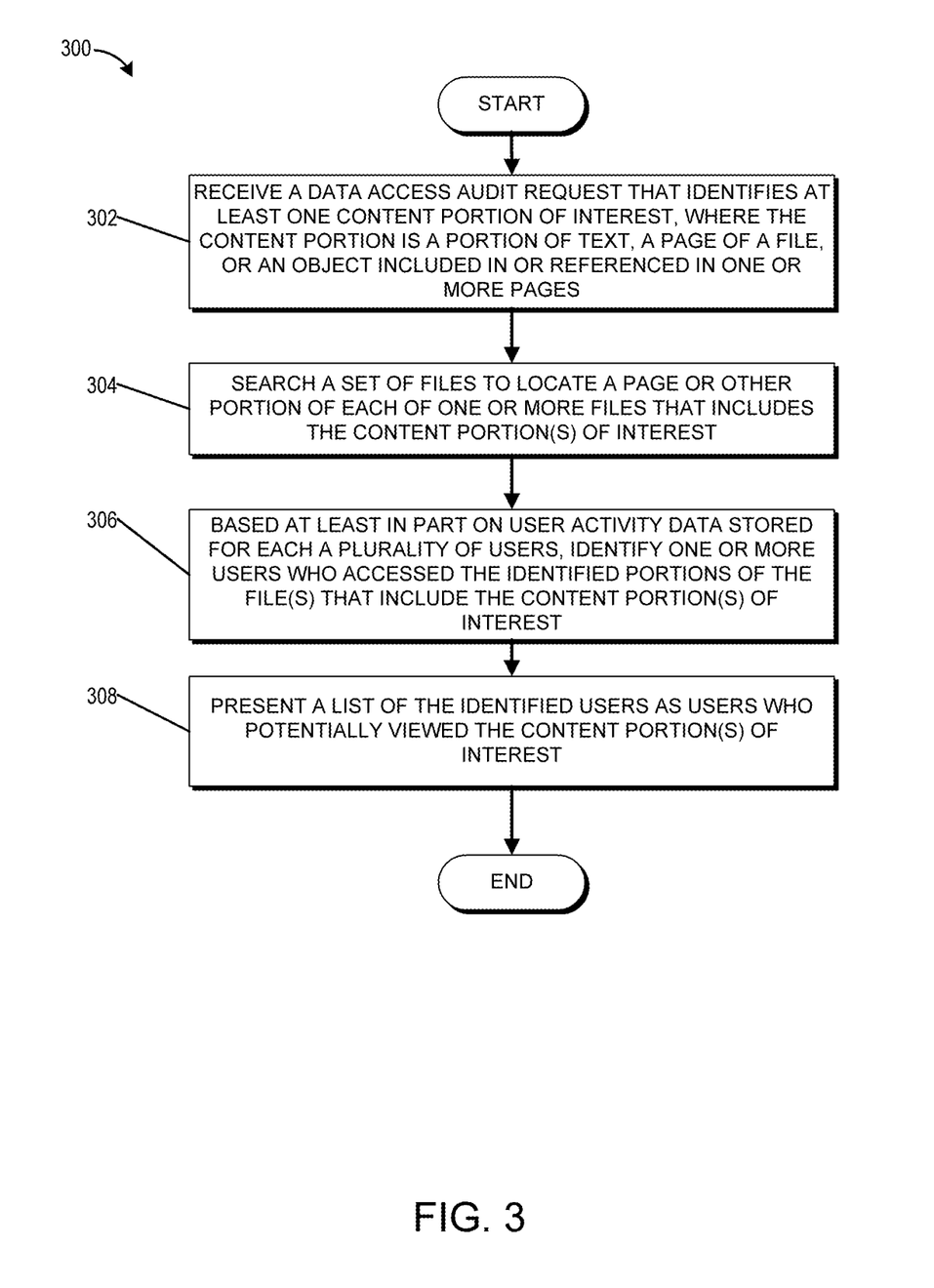
FIG. 3 is a flow diagram depicting an illustrative method for responding to data access audit requests in accordance with aspects of the present disclosure.

FIG. 3 is a flow diagram depicting an illustrative method 300 for responding to data access audit or search requests in accordance with aspects of the present disclosure. The illustrative method 300 may be performed, in some embodiments, by the intermediary system 104 (such as by one or more blocks performed by the headless browser 140 and one or more blocks performed by the activity audit subsystem 141). As discussed above, in some other embodiments, an organization's content server may provide headless browser and related functionality without the use of an intermediary system, in which case the organization content server 106 may perform a method similar to illustrative method 300. While the method 300 will be described below in reference to a company's internal corporate website for use by employees or other members of the company, this is for illustrative purposes and is not intended to limit the operating environment or the identification of entity types operating the respective servers or systems described herein.

The illustrative method begins at block 302, where the intermediary system 104 may receive a data access audit request or search request that identifies at least one content portion of interest. The content portion may be, for example, a portion of text, a page of a multi-page file, a discrete section of a file, or an object included in or referenced in one or more pages (such as an object from a DOM representation of a webpage). In some instances, search criteria or other information associated with the request may identify a class, type or set of multiple content portions or information. For example, the identification information may be a content type designation, such as a particular access privilege level (e.g., content tagged as accessible only to a certain class of employee), a level of information sensitivity (e.g., confidential information), or a security classification (e.g., content marked as top secret). In other embodiments, the request may identify one or more specific portions of content as opposed to a general class of content or information. For example, an administrative user may enter specific text or highlight a select a specific portion of a single file that the administrative user is concerned about (e.g., information that the administrative user may have determined was leaked or improperly shared by an employee to someone outside of the company).

At block 304, the intermediary system 104 searches a set of files to locate a portion of each of one or more files that includes the one or more content portions of interest. For example, the intermediary system may search the text, other content and/or DOM representations (depending on the form and type of the content portion of interest) of some or all of the files accessible via the content server 106 to identify each file that includes at least one of the one or more content portions of interest. Thus, when references are made herein to searching a "file" to identify a content portion of interest (or similar references to identifying that a user accessed a content portion of interest of a file), the file may refer to a DOM representation, to a underlying HTML or other page that includes markup or code in addition to text for display, or to a cached graphical representation of a page as it was sent to a user, depending on the embodiment. As one example according to one embodiment, if the content portion of interest is a particular paragraph of text, the intermediary system may identify each of the organization's network-accessible pages or files (such as HTML files) in which that paragraph appears. As another example, if the content portion of interest is content that was displayed to a user as a result of code within an organization's page causing the content portion of interest to be dynamically retrieved from a server and displayed on a rendered page, the intermediary system may identify cached graphical page representations that include the content portion of interest. For each file in which the content portion or information of interest is found, the intermediary system may store an indication of the location of the relevant content portion within the file. The location may be defined by (or with reference to) a DOM object (e.g., identified with reference to an identifier that is included within a DOM representation of a page), a page section, a page number within a multi-page document, by pixel coordinates within image data, and/or in another manner depending on the format of the file and the type of content of interest. In some embodiments in which a specific portion of a single file was designated for the search, block 304 may be skipped. In other such embodiments, additional files may nonetheless be searched in order to determine if the same information or content portion of interest is included in any other files.

Next, at block 306, the intermediary system 104 may perform a search of the user activity data stored in the logged user behaviors data store 144 to identify any users who accessed the identified portions of the pages or files that include the content portions or information of interest. For example, the intermediary system 104 may first identify which users accessed at least one of the files that the intermediary system determined to be relevant (e.g., the files that include at least one of the content portions or information of interest). The intermediary system may then determine, based on user interaction data stored in association with the browsing session in which each given user accessed a relevant file, which of those users actually accessed the specific portion of the file in which the relevant object or information appears (as was determined at block 304). For example, if the intermediary system determined that the content portion of interest appears in the third subset of a certain file's graphical representation (as subsets were discussed above), the intermediary system may determine which of the users who viewed that given file's graphical representation scrolled to the third subset or otherwise received the third subset of graphical data. The intermediary system may make this determination, as one example, by locating an action in the stored action data associated with a user's interactions with the relevant file that represents an action type of "scroll" and a target value identifying the third subset or other relevant section or page number, depending on the embodiment. Various user actions that may be considered will be described further below with reference to FIG. 4.

Once the users that accessed the relevant content or information have been identified, the intermediary system 104 may present a list of the identified users with an indication that each of these users potentially viewed at least one of the content portions of interest (e.g., that the listed users navigated to the relevant portion of a file, and a content portion of interest was presented for display). One example of a presented list will be discussed below with reference to FIG. 6. The list may represent users who likely or potentially viewed the relevant content portion or information (as opposed to identifying that they definitely viewed the relevant content portion or information) because the content may have been delivered to the user device for display, but the user may or may not have actually focused his eyes on the specific content and read or otherwise consumed the content. In some embodiments, the intermediary system may further supplement the list with interaction information that provides a greater level of confidence regarding whether a given user actually consumed the content. For example, the intermediary system may determine whether the user took a screenshot while the relevant content was displayed (which may be determined from the stored interaction data previously sent by the client device to the intermediary system), whether the user highlighted the portion and/or copied the portion to an clipboard (e.g., copying to a clipboard associated with the operating system of the client device for later pasting into a new document), or whether the interaction data indicates that the user otherwise interacted specifically with the relevant content or information.

Figure 4:
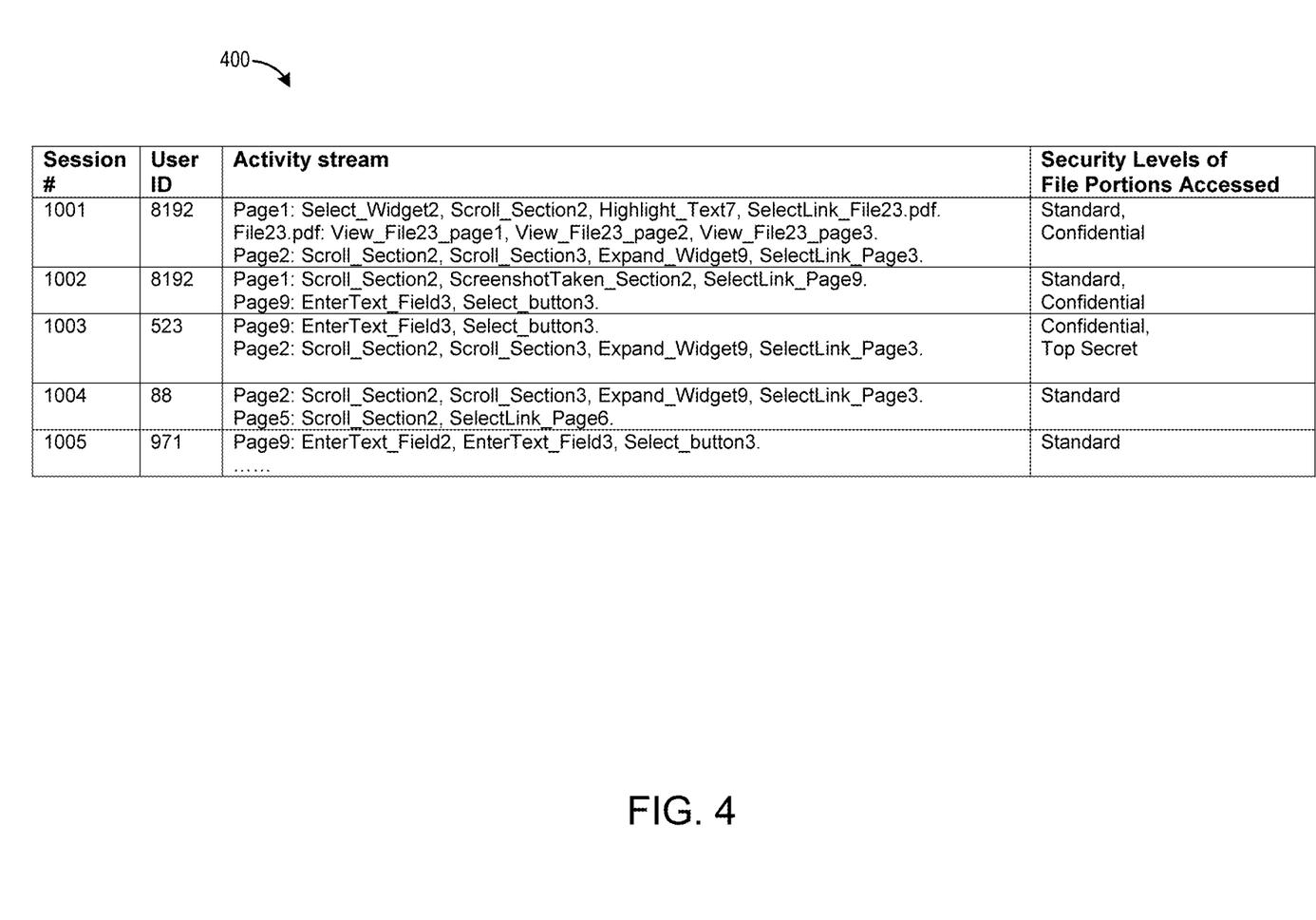
FIG. 4 is an illustrative table representation of user activity data identifying a series of user actions taken with respect to graphical page representations for each of a number of different users.

FIG. 4 is an illustrative table representation 400 of user activity data identifying a series of user actions taken with respect to graphical page representations for each of a number of different users. The data represented in table 400 is intended to provide an illustration of user activity data that may be stored by the intermediary system 104, such as in logged user behaviors data store 144. However, it will be appreciated that the presentation format of the data illustrated is not necessarily representative of the format or data structure in which the user activity may be stored. For example, the illustrated data would not necessarily be stored in a table format or as lists of user actions. Instead, it will be appreciated that a wide variety of data structures and database types are appropriate for storing such activity data, capturing the relationships between particular users and particular actions, and for depicting the order of user actions in an activity stream.

As illustrated in FIG. 4, the user activity data may be grouped by session identifier and/or by user identifier. A session may, in some embodiments, correspond to a period of time in which a user operating a user computing device 102 was relatively continually or consistently interacting with page content received from the intermediary system 104. As an example, a given session may include a series of user actions that all occurred without any gap of a threshold duration occurring between any two actions in the series (e.g., without a session "timing out" due to a certain period of inactivity, such as ten minutes). In other embodiments, a session may be defined at least in part by the organization associated with the content server 106 (such as the length of time that a user may be logged into an account with the organization without being asked to enter a password or other credential data), or may last for the length of time that a given user continues to access pages from the same computing device.

The user identifiers illustrated in table 400 may represent, for example, identifiers of user accounts maintained by the organization's content server 106. For example, if the organization is a company, the various user identifiers may each be an account number or account name for a different employee of the company. While the user identifiers appear as numbers in the illustrated embodiment, the user identifiers for some organizations may instead be in the form of an alphanumeric name (such as "john.smith"), which may also be the user name that a given employee enters, along with a password, in order to login or otherwise authenticate himself as eligible to access a corporate website of his employer (e.g., the organization that operates content server 106).

The activity stream (which may also be referred to as user activity data) associated with each session in table 400 includes identification of each of a series of actions taken by the given user in the given session. For example, as illustrated in the first row of table 400, a user having the user identifier "8192" accessed three files (identified as "Page1," which may be a webpage, "File23.pdf," which may be a PDF file, and "Page2") during browsing session number "1001." In the illustrated embodiment, each action is identified by both an action type and an object of the action, which are separated by an underscore (e.g., "Scroll_Section2" may indicate that the action was a scroll action, and that the user scrolled to a section or portion of the page identified as "Section2"). While interacting with the page identified as "Page1," the activity stream data in the first row of table 400 represents that the user performed four actions, identified in order as "Select_Widget2" (which may represent that the user clicked, tapped or otherwise selected at least a portion of content that was generated by a particular code module named "Widget2"), "Scroll_Section2," "Highlight_Text7" (which may indicate that the user used a cursor or touch gesture to highlight a portion of text on the page, where that text portion has been labeled "Text7"), and "SelectLink_File23.pdf" (which may indicate that the user select a hyperlink or other option on the page to request a URI of a particular file named "File23.pdf"). As another example, the activity data for File23.pdf for session #1001 indicates that the user viewed three different numbered pages of the file (e.g., "View_File23_page1" may represent that the user having user identifier 8192 viewed the first page of File23), which may have each been the result of the user scrolling or paging down in a browser. If File23 has more than three pages, the intermediary system may be able to determine from this interaction data that the user did not view or receive the fourth or subsequent pages of File23 during session #1001. The format of actions illustrated in table 400 is meant for illustrative purposes according to one embodiment, and it will be appreciated that other formats may be used to identify an action type, action target, and/or other associated data in other embodiments.

In addition to the scrolling, selection and highlighting action types mentioned above, table 400 includes other types of actions, such as a user entering text in a text field presented on the page (e.g., "EnterText_Field2"), pressing or otherwise selecting a button presented on the page (e.g., "Select_button3"), and requesting to expand the amount of content presented by a given code module (e.g., "Expand_Widget9"). As will be appreciated by one of skill in the art, these actions include types of actions that would not typically be reported from a client device back to a server in a traditional browsing environment (e.g., an environment in which the client device receives HTML or similar pages from a server rather than receiving graphical page representation with accompanying emulated control data). However, such rich interaction data is received by the intermediary system 104 in order to properly respond to emulated controls and otherwise properly respond to page interactions with respect to a graphical page representation that has been sent to a user device for display. As an example, in a typical client-server environment, a client device accessing a typical web page would not typically report user actions such as scrolling or text highlighting. Accordingly, the activity stream data received by the intermediary system 104 for each user session may go well beyond the typical link selection and similar limited actions that a typical server may have access to in its "clickstream" data of user actions, and may include many other types of actions beyond even those represented in table 400. Example additional actions may include, for example, various types of zooming, scrolling, highlighting, checkbox or radio button selections prior to form submission, selecting to expand the options in a pull-down menu, hovering of a cursor or similar action for interacting with a tooltip object, other touch or click actions that cause additional content to be displayed, a long press gesture or right-click action (which may cause options to appear such as saving a file), taking a screenshot, etc. In some embodiment, an administrator or other designated user associated with the organization may set the level of interaction tracking that occurs and/or the length of time that the interaction data is maintained in storage.

Table 400 additionally includes indication of the security levels of file portions accessed during each session. For example, the indication of "Standard" and "Confidential" for session #1001 may indicate that, during that browsing session, the user having user identifier 8192 viewed at least one file that included content with a "standard" security designation and at least one file that included content with a "confidential" security designation. The various security or other content type designations may be different depending on the particular organization or context. In some embodiments, entire files may be tagged with a security or other type designation in metadata of the file (e.g., a certain government document may be tagged as "Top Secret"). In other embodiments, individual portions of a single file may have different designations, which may be tagged in a markup language or associated with different objects in a DOM representation. In some embodiments, the information indicating security levels accessed during a session may be determined and stored in real time during the browsing session. In other embodiments, the intermediary system may perform a batch process at a later time to replay interaction data and determine which security designations were accessed.

Figure 5:
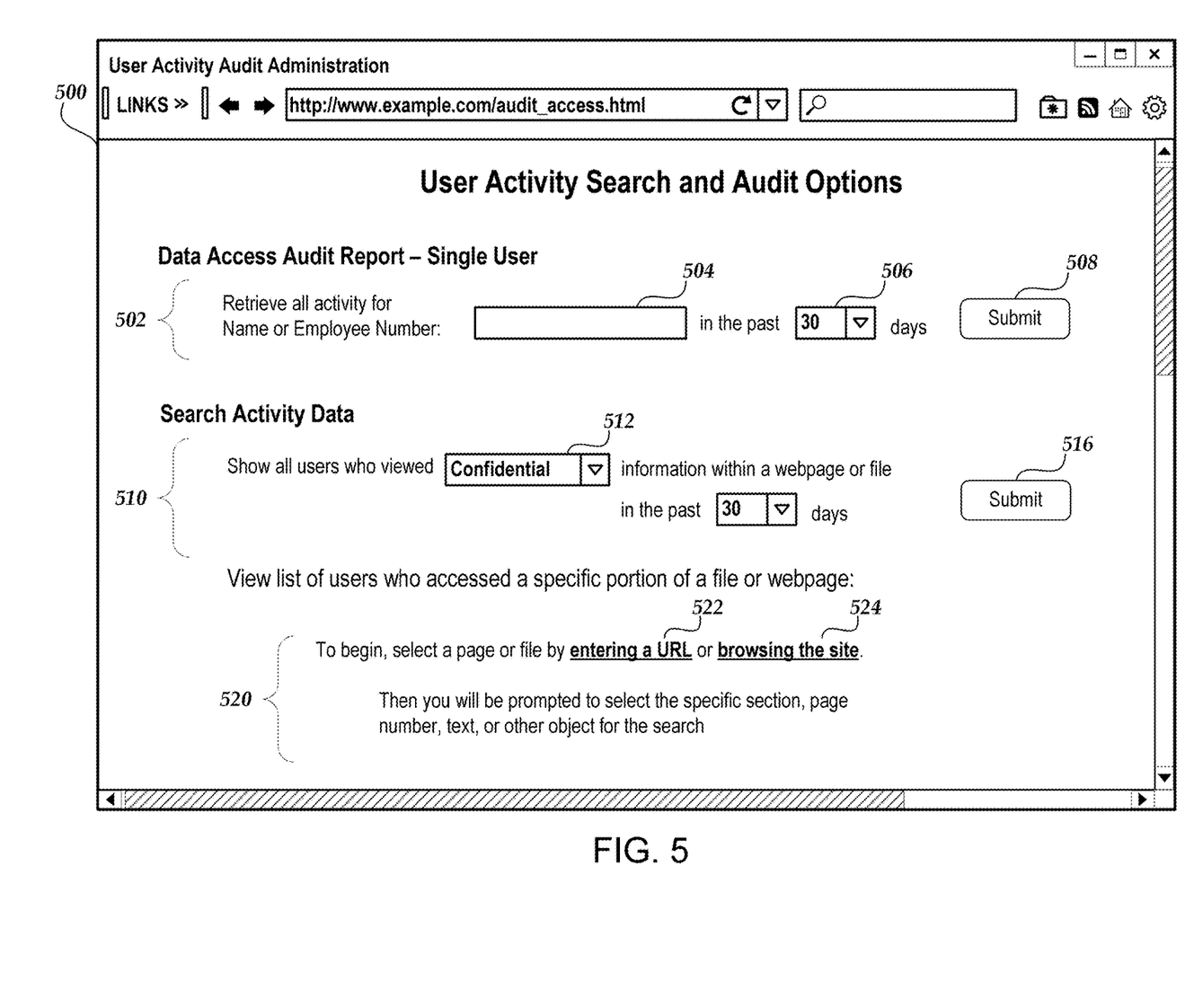
FIG. 5 is an illustrative user interface that enables an administrator to enter criteria for requesting a search or audit of user activity data.

FIG. 5 is an illustrative user interface 500 that enables an administrator to enter criteria for requesting a search or audit of user activity data. The user interface may be generated by the intermediary system 104, in some embodiments, for display on an organization administrator's device 108. The device 108 may be operated by, for example, an information technology ("IT") administrator within the organization that has its content available via content server 106. The administrator may choose to perform a search via interface 500 as part of a routine data access audit, or in response to learning that there has been a leak of corporate information or proprietary content to an entity outside of the organization.

The user interface 500 includes a first search section 502 that enables the administrator to enter an employee or other user's name or user identifier in text field 504, and select a time period via menu 506 (e.g., the current selection will search the past 30 days of activity). Once entering text in field 504, the administrator may request the search to be performed by selecting submit option 508. The second search section 510, which may be completed independently from section 502, enables the administrator to select submit option 516 in order to request that the intermediary system display a list of all users who viewed any content or other information tagged with a specific designation (in this case, the "Confidential" designation is selected in menu 512) during a specified time period.

A third search section 520 in user interface 500 enables the administrator to select specific information or a specific content portion rather than all content that fits certain criteria (such as the content type designations that can be searched in sections 502 and 510). The administrator may select option 522 in order to be presented with a subsequent interface in which the administrator may enter a URI of a page or file, or may select option 524 to browse the organization's website or a file directory to identify a file for which the administrator is interested in searching user access data. Once the user is presented with the specific file of interest, an interface may enable the administrator to highlight or otherwise select the specific section, page number, text portion, DOM object, or other portion of the file (not illustrated). The administrator may then request that the intermediary system provide a list of users who accessed the particular portion of the file over a given time period.

Figure 6:
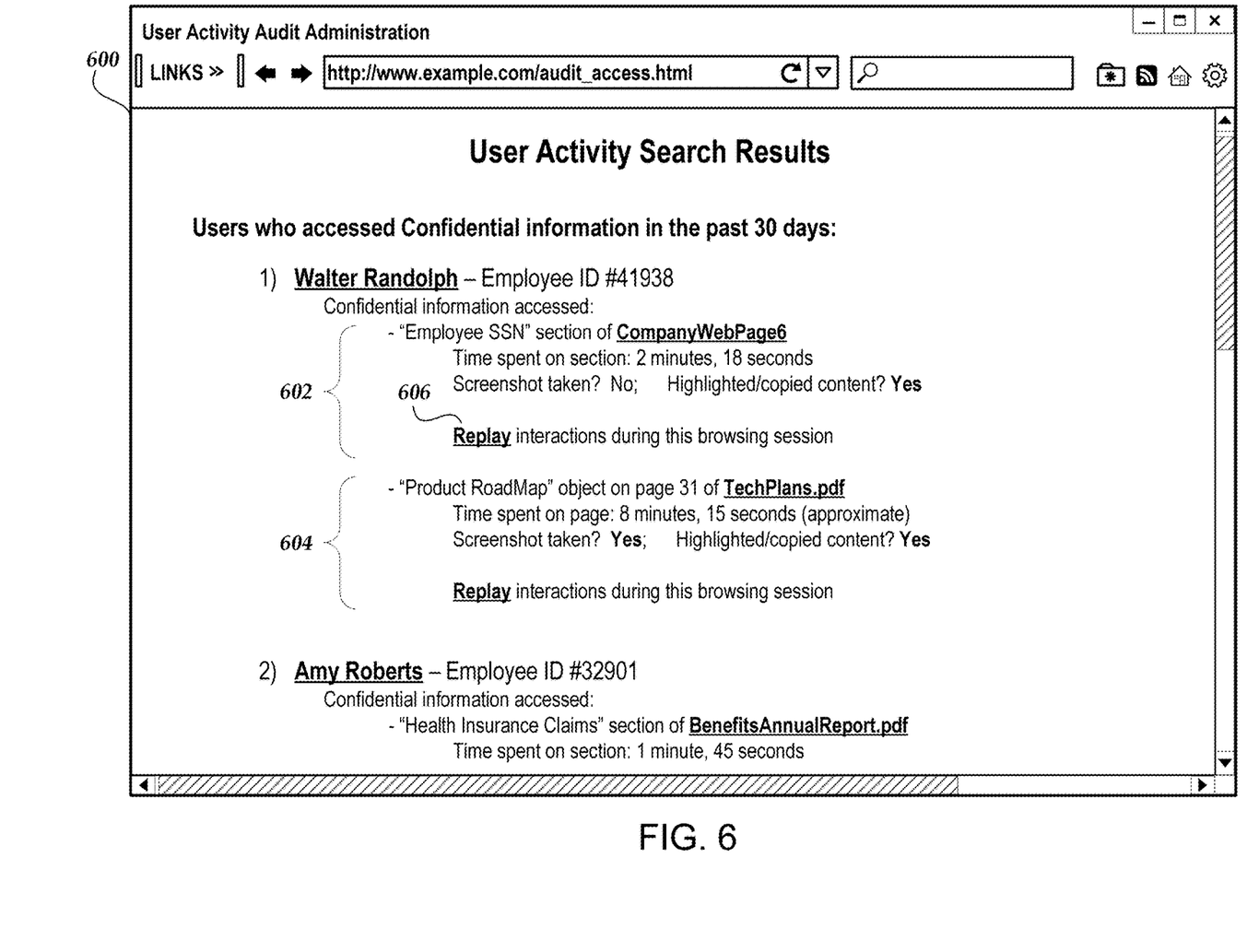
FIG. 6 is an illustrative user interface that presents user activity search results matching search or audit criteria entered by an administrator.

FIG. 6 is an illustrative user interface 600 that presents user activity search results matching search or audit criteria entered by an administrator, such as search criteria entered via user interface 500 discussed above. The user interface may be generated by the intermediary system 104 for display on the organization administrator's device 108. The information included in user interface 600 may have been determined by the intermediary system according to methods described herein, such as in FIG. 3 discussed above. In the illustrated user interface 600, two users (Walter Randolph and Amy Roberts) are identified as having accessed confidential information accessible from the content server 106 over a 30 day period. As illustrated, Walter Randolph accessed a confidential section of the file "CompanyWebPage6" (reflected in section 602), as well as a confidential object in the file "TechPlans.pdf"). The information for each confidential portion accessed includes an indication of an estimated length of time the user spent viewing the relevant content (which may be determined by the intermediary system based on time stamps of user interactions, such as the difference between a time of a first action that caused the specific section of the file to be displayed and a time of a second action that resulted in navigating away from the file or specific section). The information for each confidential portion accessed further includes indications of whether the user took a screenshot while the relevant content was displayed, and whether the user highlighted and/or copied the relevant content to a clipboard. The administrator may select replay option 606 in order to request that the intermediary system begin an animated reenactment of the user's interactions with the content. For example, selection of option 606 may cause the intermediary system to present an equivalent graphical representation of the file "CompanyWebPage6" as was displayed to Walter Randolph previously, and to replay the stored user actions performed by Walter Randolph (which may include scrolling, highlighting text, entering text in a field of the page, etc.).

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure and protected by the following claims.

What is claimed is:

1. A system comprising:
   an electronic data store that stores user activity information identifying user interactions with visual page representations associated with an organization, wherein the user activity information includes identification of user interactions initiated by a plurality of users that are members of the organization; and
   at least one hardware processor in communication with the electronic data store, the at least one hardware processor configured to execute computer-executable instructions to at least:
      receive, from each of a plurality of computing devices, page interaction data for graphical representations of pages associated with the organization, wherein the graphical representations of pages are rendered by the system;
      update the user activity information in the electronic data store based on the page interaction data, wherein the updated user activity information includes information identifying specific portions of the graphical representations of pages with which users interacted;
      receive search criteria associated with a request to search the user activity information, wherein the search criteria identifies at least one content portion of interest, wherein the content portion of interest is less than an entire file and comprises a portion of text or an object referenced within a page;
      determine a relevant file from among a plurality of files that are associated with the organization, wherein the relevant file is determined to include the content portion of interest;
      retrieve a relevant set of user activity information from the electronic data store, wherein the relevant set of user activity information includes, for each of a first plurality of users that have accessed the relevant file, a series of actions performed by the user with respect to the relevant file;
      determine, based on a first series of actions performed by a first user with respect to the relevant file, that one of the content portions of interest was presented for display on a computing device associated with the first user; and generate search results for the request to search the user activity information, wherein the search results identify a user who accessed the content portion of interest, wherein the search results identify the first user.

2. The system of claim 1, wherein the content portion of interest is identified in the search criteria by a content type designation, wherein the content type designation relates to an access privilege level, a level of information sensitivity, or a security classification.

3. The system of claim 1, wherein the user interactions identified in the user activity information include user scroll requests.

4. The system of claim 1, wherein the content portion of interest is included in the search criteria based on a determination that the content portion of interest has been viewed by an individual outside of the organization.

5. A computer-implemented method comprising:
as implemented by one or more computing devices configured with specific executable instructions,
receiving search criteria related to electronic data access records, wherein the search criteria identifies a content portion of interest;
determining a relevant file from among a plurality of files that are accessible via a network, wherein the relevant file includes the content portion of interest;
retrieving user activity information from an electronic data store, wherein the user activity information includes, for each of a plurality of users that have accessed the relevant file via the network, a series of actions performed by the user with respect to the relevant file;
determining, based on a first action performed by a first user with respect to the relevant file, that the content portion of interest was presented for display on a computing device associated with the first user; and
generating search results corresponding to the search criteria, wherein the search results identify one or more users who accessed the content portion of interest, wherein the search results identify the first user.

6. The computer-implemented method of claim 5, further comprising:
determining that the content portion of interest appears on a specific page of a first file, wherein the first file includes a plurality of pages;
identifying that a second user accessed the first file; and
determining, based an action performed by the second user with respect to the first file, that the second user did not access the specific page of the first file that includes the content portion of interest.

7. The computer-implemented method of claim 5, wherein the content portion of interest is identified in the search criteria by a type designation, wherein the content type designation relates to an access privilege level, a level of information sensitivity, or a security classification.

8. The computer-implemented method of claim 7, wherein the content portion of interest comprises a plurality of content portions, wherein the content type designation has previously been assigned to each of the plurality of content portions.

9. The computer-implemented method of claim 5, wherein the content portion of interest is less than the entire content of the relevant file.

10. The computer-implemented method of claim 5, wherein the content portion of interest comprises a page of a file, a portion of text, or an object associated with the file.

11. The computer-implemented method of claim 10, wherein the file is a webpage and the content portion of interest is identified using an object in a Document Object Model associated with the webpage.

12. The computer-implemented method of claim 5, further comprising generating a list of two or more users that viewed the content portion of interest, wherein the search results include the list.

13. The computer-implemented method of claim 12, wherein the list includes an indication of an estimated amount of time that the content portion of interest was presented for display to each user included in the list of two or more users, wherein the estimated amount of time is determined based on the user activity information.

14. A system comprising:
an electronic data store that stores user activity information, wherein the user activity information includes, for each of a plurality of users that have accessed at least one file via a network, an action performed by the user for an accessed file; and
at least one hardware processor in communication with the electronic data store, the at least one hardware processor configured to execute computer-executable instructions to at least:
receive a data access audit request that identifies information that is accessible via the network;
determine a relevant file from among a plurality of files that are accessible via the network, wherein the relevant file includes the information;
retrieve a relevant set of user activity information from the electronic data store, wherein the relevant set of user activity information includes, for each of the plurality of users that have accessed the relevant file via the network, a series of actions performed by the user with respect to the relevant file;
determine, based on an action performed by a first user with respect to the relevant file, that the information was transmitted to a computing device associated with the first user; and
generate results for the data access audit request, wherein the results identify one or more users who accessed the information, wherein the results identify the first user.

15. The system of claim 14, wherein the information is identified in the data access audit request by an access privilege level of the information.

16. The system of claim 14, wherein the information is included in both a first file and a second file, wherein the first file is different than the second file, wherein both the first file and the second file further include additional information other than the information.

17. The system of claim 16, wherein the at least one hardware processor is further configured to:
determine that the information appears on a specific page of a first file, wherein the first file includes a plurality of pages;
identify that a second user accessed the first file; and
determine, based on an action performed by the second user for the first file, that the second user did not access the specific page of the first file that includes the information.

18. The system of claim 17, wherein the action performed by the first user includes a scroll action that caused the system to send the specific page of the first file to the computing device associated with the first user.

19. The system of claim 14, wherein the action performed by the first user comprises a selection by the first user of an option that caused additional content to be displayed within a graphical representation of a page.

20. The system of claim 14, wherein the action performed by the first user comprises a long press, expanding a menu, selecting a tooltip object, or hovering a cursor.

* * * * *